(12) United States Patent
Gao et al.

(10) Patent No.: US 11,281,537 B2
(45) Date of Patent: Mar. 22, 2022

(54) MANAGING MAPPED RAID EXTENTS IN DATA STORAGE SYSTEMS

(71) Applicant: EMC IP Holding Company LLC, Hopkinton, MA (US)

(72) Inventors: Jian Gao, Beijing (CN); Ilya Usvyatsky, Northborough, MA (US); Weihua Li, Beijing (CN); Geng Han, Beijing (CN); Xinlei Xu, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 15 days.

(21) Appl. No.: 16/590,443

(22) Filed: Oct. 2, 2019

(65) Prior Publication Data
US 2020/0034235 A1    Jan. 30, 2020

Related U.S. Application Data

(63) Continuation of application No. 15/669,882, filed on Aug. 4, 2017, now Pat. No. 10,521,302.

(51) Int. Cl.
| | |
|---|---|
| *G06F 11/10* | (2006.01) |
| *G06F 3/06* | (2006.01) |
| *G06F 11/20* | (2006.01) |
| *G06F 17/18* | (2006.01) |

(52) U.S. Cl.
CPC .......... *G06F 11/1092* (2013.01); *G06F 3/061* (2013.01); *G06F 3/0632* (2013.01); *G06F 3/0644* (2013.01); *G06F 3/0647* (2013.01); *G06F 3/0689* (2013.01); *G06F 17/18* (2013.01); *G06F 11/2094* (2013.01)

(58) Field of Classification Search
CPC .... G06F 11/1092; G06F 3/061; G06F 3/0632; G06F 3/0644; G06F 3/0647; G06F 3/0689; G06F 17/18; G06F 11/2094
See application file for complete search history.

(56) References Cited

U.S. PATENT DOCUMENTS

| | | | |
|---|---|---|---|
| 10,372,561 B1* | 8/2019 | Wei ..................... | G06F 11/1088 |
| 2012/0047287 A1* | 2/2012 | Chiu ..................... | G06F 3/0647 |
| | | | 710/8 |
| 2013/0145091 A1* | 6/2013 | Klemm ................. | G06F 3/0644 |
| | | | 711/114 |

(Continued)

*Primary Examiner* — Nanci N Wong
(74) *Attorney, Agent, or Firm* — Krishnendu Gupta; Deepika Bhayana; Dorothy Wu Chiang

(57) ABSTRACT

A technique for use in managing mapped RAID extents is disclosed. A neighborhood matrix denoting a distribution of neighboring physical storage portions across the N physical storage devices of the pool is created and initialized. A disk extent consumed array denoting a disk consumption metric is created and initialized. Disks in an extent pool are analyzed to identify a least consumed disk in the extent pool and a disk extent is allocated from the identified disk. The allocated disk extent is configured as a first disk extent for a first RAID extent. The neighborhood matrix and disk extent consumed array are updated appropriately. All the disks in the extent pool are analyzed to identify a valid disk extent that will result in the lowest variance value in the neighborhood matrix. The identified valid disk extent is allocated and the neighborhood matrix and disk extent consumed array are again updated.

17 Claims, 9 Drawing Sheets

(56) References Cited

U.S. PATENT DOCUMENTS

| | | | |
|---|---|---|---|
| 2015/0178004 A1* | 6/2015 | Xu | G06F 3/0665 |
| | | | 711/114 |
| 2016/0117414 A1* | 4/2016 | Verma | G06F 16/24561 |
| | | | 707/798 |
| 2017/0147237 A1* | 5/2017 | Fang | G06F 3/0647 |

* cited by examiner

MANAGING MAPPED RAID EXTENTS IN DATA STORAGE SYSTEMS

TECHNICAL FIELD

The present invention relates to a system and method for managing mapped RAID extents in data storage systems.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

A technique for use in managing mapped RAID extents is disclosed. A neighborhood matrix denoting a distribution of neighboring physical storage portions across the N physical storage devices of the pool is created and initialized. A disk extent consumed array denoting a disk consumption metric is created and initialized. Disks in an extent pool are analyzed to identify a least consumed disk in the extent pool and a disk extent is allocated from the identified disk. The allocated disk extent is configured as a first disk extent for a first RAID extent. The neighborhood matrix and disk extent consumed array are updated appropriately. All the disks in the extent pool are analyzed to identify a valid disk extent that will result in the lowest variance value in the neighborhood matrix. The identified valid disk extent is allocated and the neighborhood matrix and disk extent consumed array are again updated.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
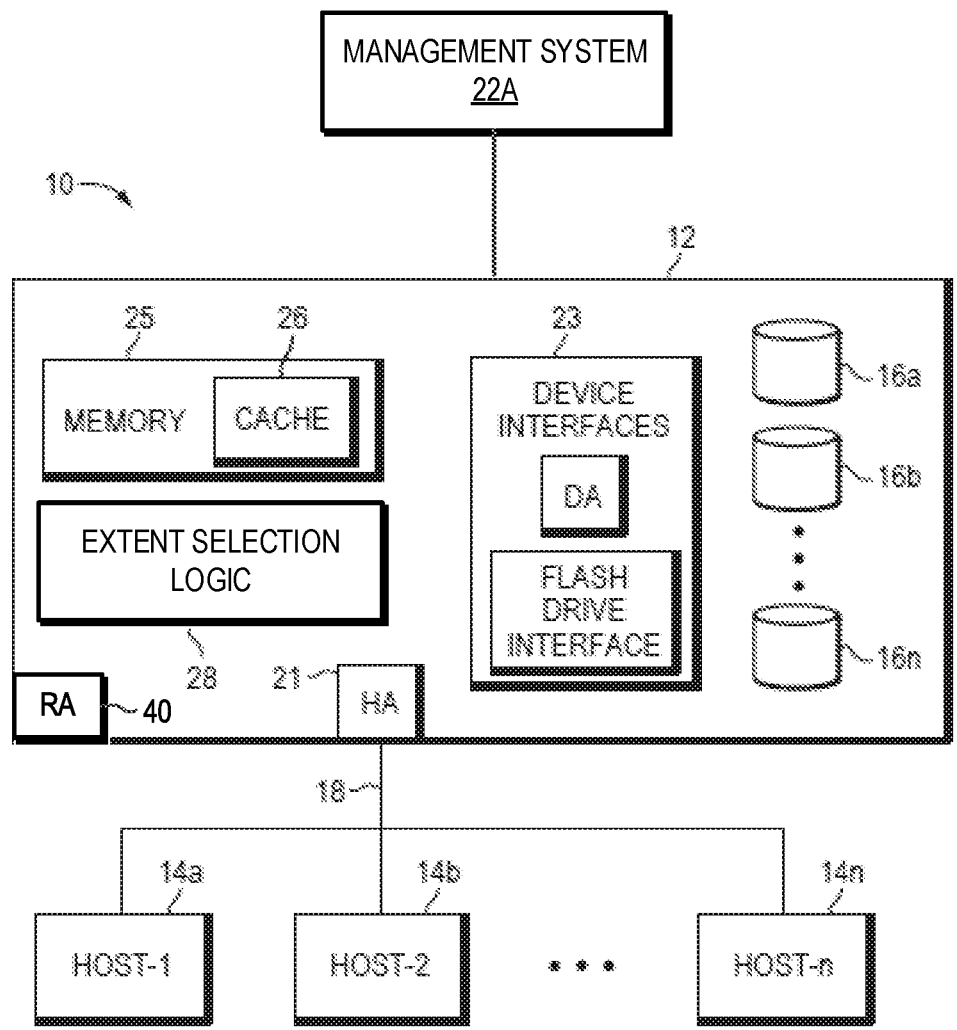
FIG. 1 is an example of a system that may utilize the techniques described herein.

Referring to FIG. 1, shown is an example of an embodiment of a system that may be used in connection with performing one or more implementations of the current techniques described herein. The system 10 includes a data storage system 12 connected to host systems 14a 14n through communication medium 18. In this embodiment of the computer system 10, the n hosts 14a 14n may access the data storage system 12, for example, in performing input/output (IO) operations or data requests. The communication medium 18 may be any one or more of a variety of networks or other type of communication connections as known to those skilled in the art. The communication medium 18 may be a network connection, bus, and/or other type of data link, such as a hardwire, wireless, or other connections known in the art. For example, the communication medium 18 may be the Internet, an intranet, network (including a Storage Area Network (SAN)) or other wireless or other hardwired connection(s) by which the host systems 14a 14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, PCIe, iSCSI, NFS, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by Dell Inc. of Hopkinton, Mass. However, the techniques described herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash memory-based SSDs (also referred to herein as "flash disk drives," "flash storage drives", or "flash drives") are one type of SSD that contains no moving mechanical parts.

The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 25. An embodiment, for example, may use one or more internal busses and/or communication modules. For example, the memory 25 may be used to facilitate data transfers and other communications between the device interfaces, HAs and/or RAs in a data storage array. In one embodiment, the device interfaces 23 may perform data operations using a cache 26 that may be included in the global memory 25, for example, when communicating with other device interfaces and other components of the data storage array. The other sub-portions of memory 25 that may be used in connection with other designations that may vary in accordance with each embodiment.

The storage array may also include extent selection logic 28. As will be described in further detail below, the extent selection logic 28 may be configured to select and allocate disk extents for use with RAID extent. In one embodiment the extent selection logic 28 may consist of one or more hardware components. In another embodiment may be firmware. In another embodiment, the extent selection logic 28 may be implemented using software employing dynamic programming techniques. In still other embodiments, the logic may include a combination of two or more such components.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Furthermore, the data storage devices 16a-16n may be connected to one or more controllers (not shown). The controllers may include storage devices associated with the controllers. Communications between the controllers may be conducted via inter-controller connections. Thus, the current techniques described herein may be implemented in conjunction with data storage devices that can be directly connected or indirectly connected through another controller.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

A map kept by the storage array may associate logical addresses in the host visible LUs with the physical device addresses where the data actually is stored. The map also contains a list of unused slices on the physical devices that are candidates for use when LUs are created or when they expand. The map in some embodiments may also contains other information such as time last access for all or a subset of the slices or frequency counters for the slice; the time last access or frequency counters. This information can be analyzed to derive a temperature of the slices which can indicate the activity level of data at the slice level.

The map, or another similar map, may also be used to store information related to write activity (e.g., erase count) for multiple drives in the storage array. This information can be used to identify drives having high write related wear relative to other drives having a relatively low write related wear.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein.

Also shown in FIG. 1 is a management system 22a that may be used to manage perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity Data Storage System by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 25 may represent memory of each such storage processor.

As known in the art, a RAID (redundant array of independent disks) group is a group of physical storage devices or members providing different levels of protection and fault tolerance within the RAID group. A RAID group provides an associated level of protection based on a particular configuration of the physical drives comprising the RAID group. The particular level of protection provided by a RAID group may be one of standard and/or known levels and configurations (e.g., RAID-0, RAID-1, RAID-5, RAID-6, and the like). In at least one embodiment, physical drives may be configured into RAID groups of one or more RAID levels. As known in the art, LUNs may have storage provisioned from, or built on top of, the RAID groups.

Described in following paragraphs are techniques that may be used to layout mapped RAID extents evenly (or approximately evenly) to all physical storage devices (PDs) of a pool. One benefit of using mapped RAID as described herein is better rebuild performance than using traditional RAID. As described in more detail below, in order to obtain improved rebuild performance with mapped RAID, techniques herein attempt to distribute mapped RAID extents as evenly as possible to the PDs. In this way, when one PD fails, all the other PDs may be involved in the rebuilding procedure. In accordance with techniques herein, processing may be performed to evenly layout RAID extents to the PDs independent of the number of PDs in the pool, independent of the number of RAID extents to be allocated, and independent of RAID extent width (e.g. number of PDs, M, in the RAID group). In at least one embodiment in accordance with techniques herein, a neighborhood matrix may be used to evaluate whether the mapped RAID extents are evenly distributed to PDs of the pool, or not. Furthermore, as described in more detail below, in at least one embodiment in accordance with techniques herein, a small subset of selection combinations may be used rather than all possible combinations to improve processing efficiency and reduce computing complexity.

As noted above, RAID may be characterized in one aspect as a data storage virtualization technology that combines multiple PDs into a single logical unit for the purposes of data redundancy, performance improvement, or both. Data is distributed across the drives in one of several ways, referred to as RAID levels, depending on the required level of redundancy and performance.

Figure 2:
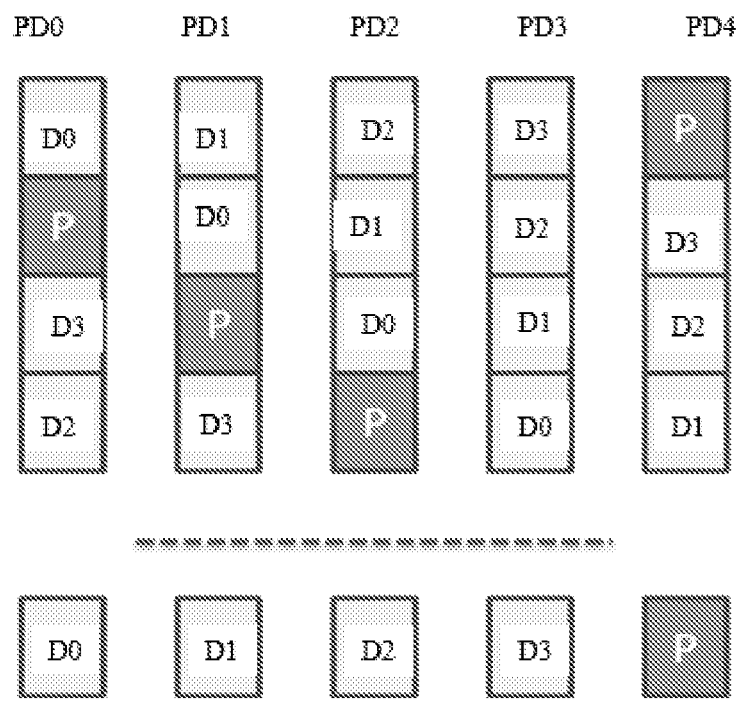
FIGS. 2 and 3 are examples illustrating a traditional RAID group configuration.
Figure 3:
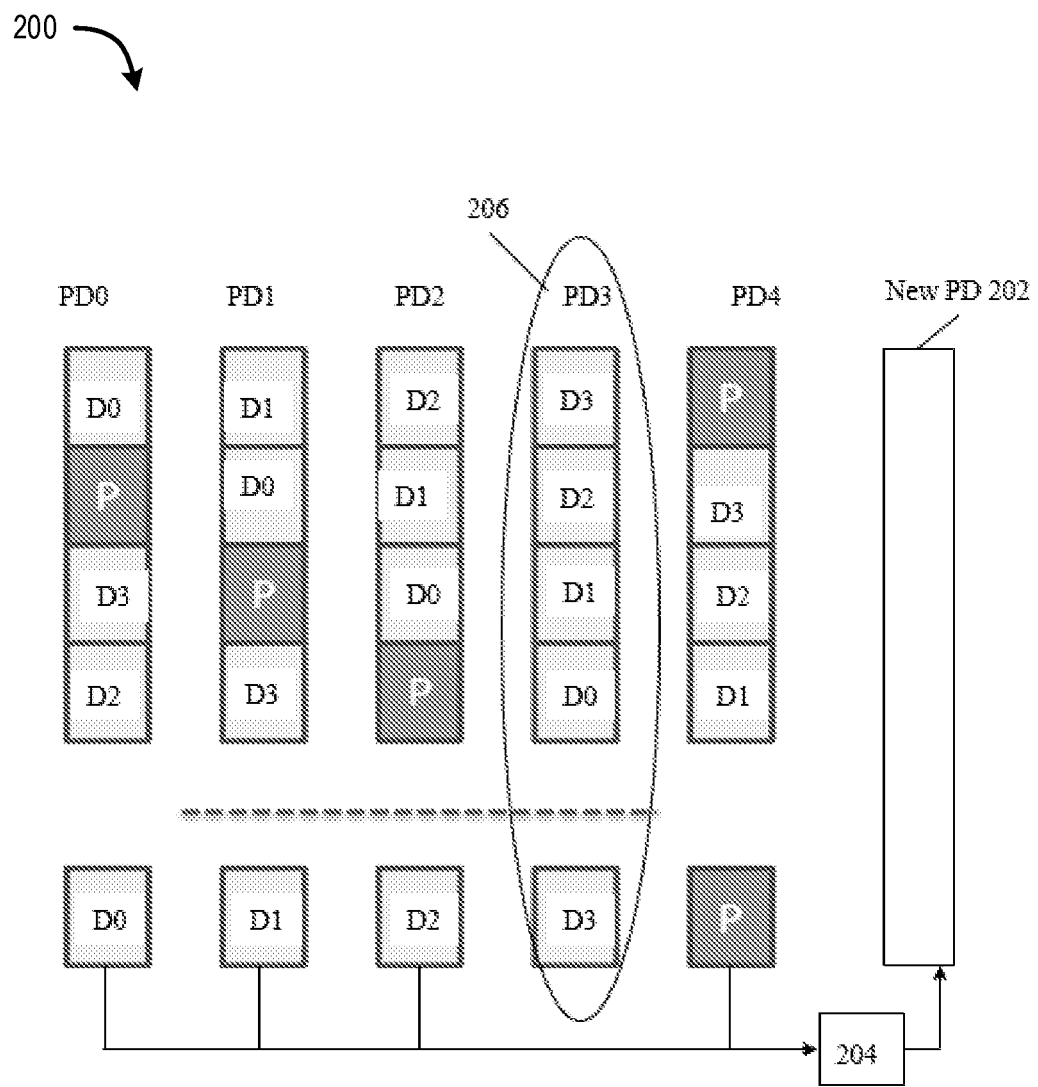

With reference now to FIG. 2, shown is an example illustrating traditional RAID 5 layout of a RAID group with 5 member PDs including 4 data PDs and 1 parity PD. As known in the art, RAID 5 provides block level striping with distributed parity. Parity information is distributed among the PDs. In the example 1200 of FIG. 2, each stripe includes 5 blocks, which includes 4 data blocks (denoted as D0, D1, D2, D3 and D4) and 1 parity block (denoted as P). Upon failure of a single PD, such as failure of PD3 206 as illustrated with reference to the example 200 of FIG. 3, subsequent reads can be calculated from the distributed parity such that no data is lost. Additionally, a hot spare PD 202 may be selected to replace the failed PD3 206 and all the data of the failed PD3 206 may be rebuilt 204 and written to the new PD 202.

With the new physical storage technologies (e.g. shingled media disk) emerging, the storage capacity of a single PD increases year by year and the rebuild time is increased accordingly. In other words, a customer may face an increased risk of double PD failure, which may result in lost data if RAID group rebuild time is not reduced. However, the rebuild time is subject to the write bandwidth of the hot spare PD replacing the failed PD. With the traditional RAID group such as in FIGS. 2 and 3, the write bandwidth of the hot spare PD may currently be a bottleneck and it may accordingly be difficult using such traditional RAID to reduce the rebuild time. As a result, mapped RAID technology described in following paragraphs may be used as described in following paragraphs.

Figure 4A:
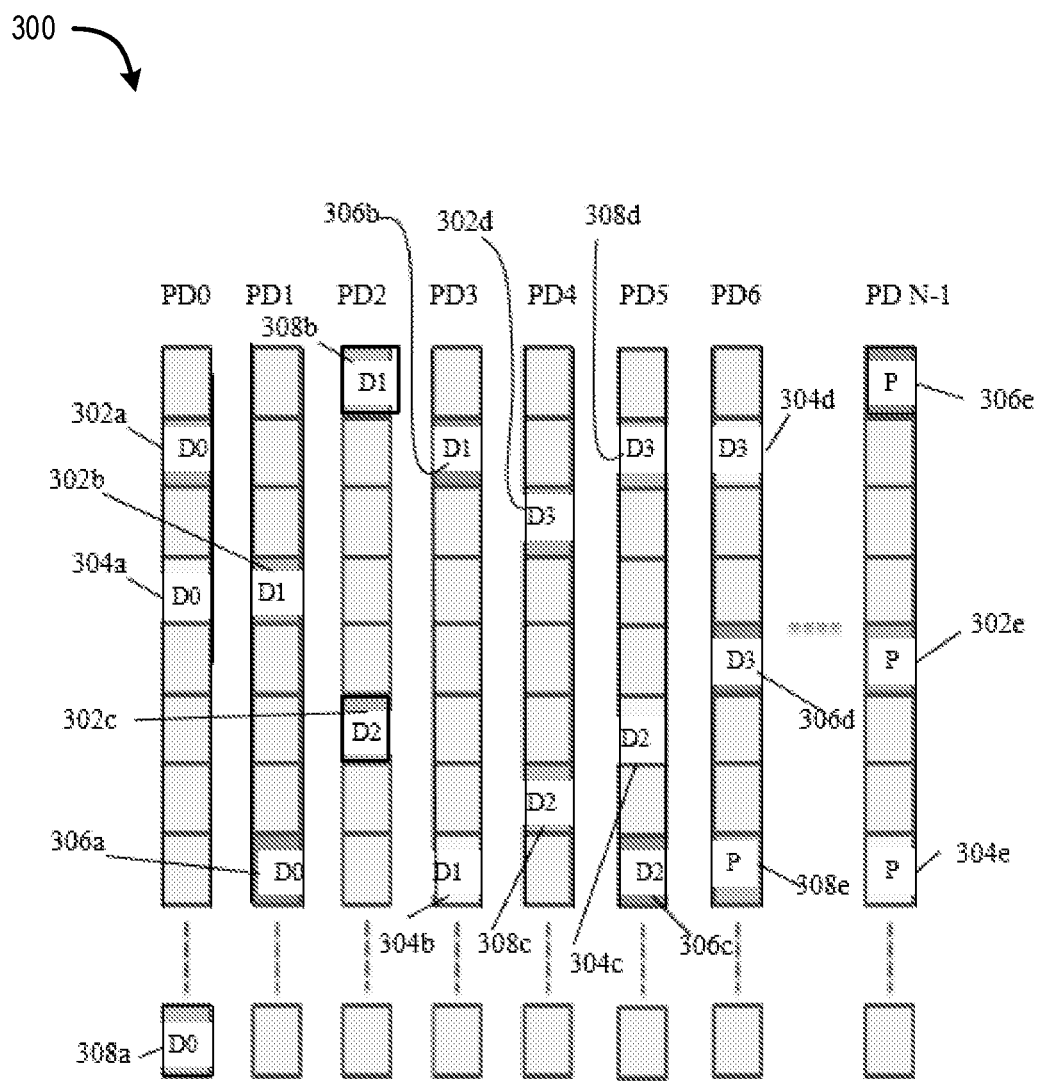
FIGS. 4A and 4B are examples illustrating mapped RAID extents of a RAID group in an embodiment in accordance with techniques herein.

Referring to FIG. 4A, shown is an example illustrating use of mapped RAID techniques in an embodiment in accordance with techniques herein. The example 300 includes a pool of N PDs, where N is an integer having a minimum value depending on the particular RAID configuration and drive members. The N PDs may be referred to using indices 0 through N−1, inclusively. For example, consider a RAID 5 configuration such as described above in connection with FIG. 2 having M=5 members including 4 data members and 1 parity member. The minimum number of PDs in the pools used for mapped RAID may be at least M, the number of RAID group members, which is 5 in this example. Thus, the number of PDs N is greater than or equal to M. It should be noted that the foregoing M may also denote the RAID extent width or number of disk extents in each mapped RAID extent as described in more detail elsewhere herein. Generally, mapped RAID is created on top of a pool of the N PDs. Each PD of the pool used for configuring mapped RAID may be viewed as a set of continuous non-overlapping fixed sized disk (PD) extents or portions. Each mapped RAID extent (also referred to herein as simply RAID extent) may include M different disk extents (e.g., PD extents or portions) whereby each disk extent is selected from a different one of the N PDs. For example, a first RAID extent A may include 5 disk extents 302a-e; a second RAID extent B may include 5 disk extents 304a-e; a third RAID extent C may include 5 disk extents 306a-e; and a fourth RAID extent D may include 5 disk extents 308a-e. In this example 300, each disk or PD extent used for storing user data is denoted Dn, where n is an integer in the range of 0-3. Each disk or PD extent used for storing parity information is denote P. Disk or PD extents which are free (unallocated) or otherwise reserved may not include any P or Dn designation in FIG. 4A.

Some of the disk extents may be reserved on each of the N PDs for use as hot spare disk extents rather than reserve an entire PD as a hot spare as in traditional RAID groups. Techniques herein may select the disk extents used in forming the mapped RAID extents with a goal of evenly distributing the RAID extents to all N PDs of the pool. When one of the N PDs of the pool fails, for each disk extent on the failed PD that is included in a mapped RAID extent, a replacement disk extent may be obtained by selecting another replacement disk extent from one of the other remaining active/live/healthy PDs of the pool. Such selection may be based on specified criteria. When selecting disk extents for inclusion in a mapped RAID extent for such replacement due to a failed PD, the selection criteria may include selecting the replacement disk extents so as to guarantee that each mapped RAID extent includes disk extents on 5 different PDs. Additionally, selecting replacement disk extents for dead disk extents of the failed PD may be performed in manner based on another selection criteria that distributes the dead disk extent replacements evenly among the remaining N−1 PDs of the pool.

Figure 4B:
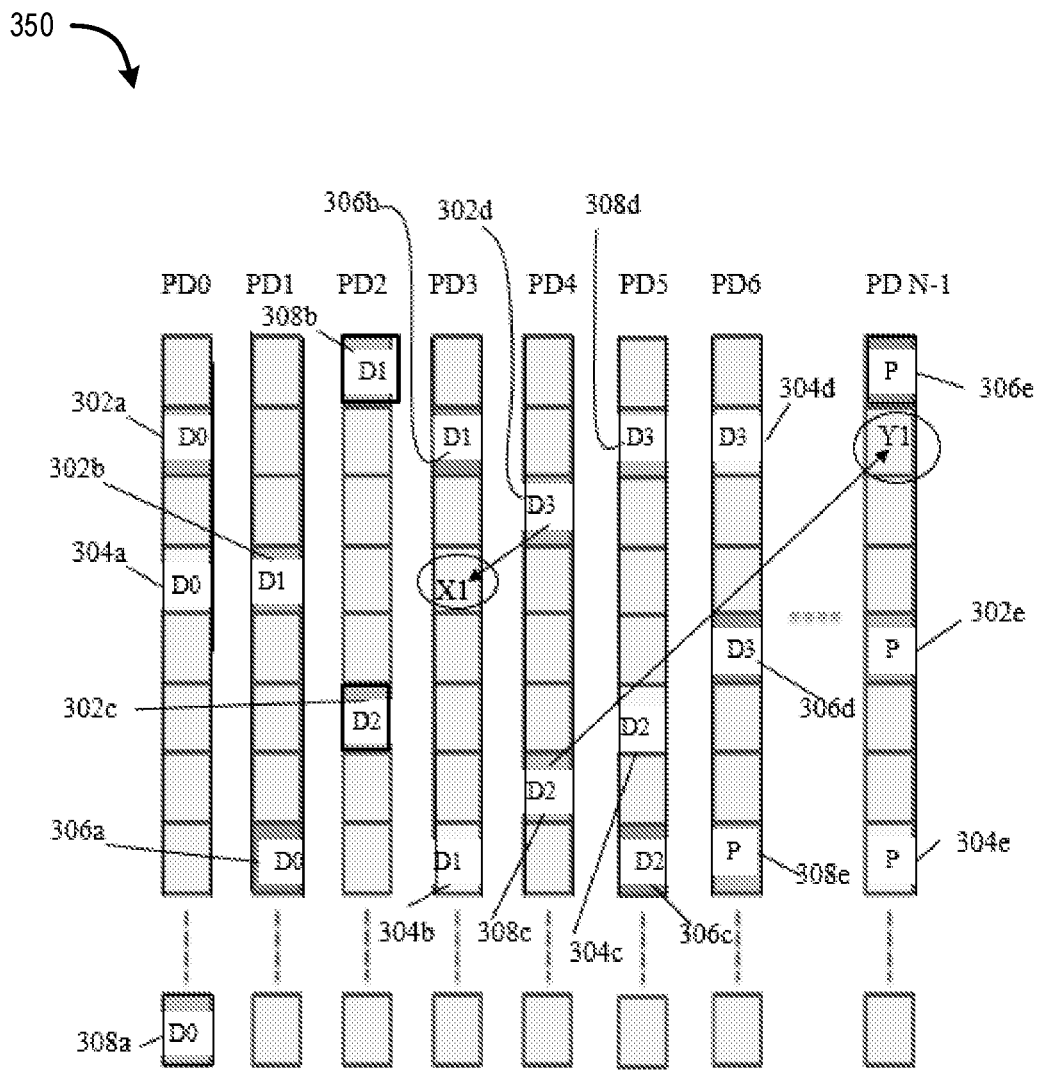

For example, with reference to FIG. 4B, assume PD4 fails whereby disk extents 302d and 308c may be relocated to another one of the N PDs. In accordance with the criteria noted above, disk extent 302d may be relocated to disk extent X1 on PD3, and disk extent 308c may be relocated to disk extent Y1 on PD N−1.

As may be appreciated by those skilled in the art, with mapped RAID techniques such as illustrated in FIGS. 4A and 4B, there no longer exists the limitation of the single spare PD write bandwidth, since techniques herein replace dead disk extents with extents on different PDs. Additionally, in order to maximize rebuild performance, as many PDs as possible should participate in the rebuilding procedure (as performed in connection with rebuilding or reconstructing dead disk extents using well known techniques known in the art that vary with the particular RAID level and configuration). To achieve an improved rebuild performance, techniques herein may include processing to evenly distribute (as evenly as possible) mapped RAID extents across all PDs of the pool when creating/forming mapped RAID extents.

In at least one embodiment in accordance with techniques herein, the disk extent selection processing (e.g., performed to select disk extents for a mapped RAID extent) may take into account the number N of PDs in the pool, the RAID extent width, and the RAID capacity in terms of the count or number of RAID extents that can be allocated from the pool (e.g., mapped RAID extent capacity of number of mapped RAID extents possibly formed from the pool of N PDs). Described in following paragraphs are techniques that may be performed to further adapt mapped RAID for use which makes mapped RAID more scalable and efficient. Such further techniques may be used no matter how many PDs are in the pool, no matter how many RAID extents are going to be allocated, and no matter what the RAID extent width is.

Before describing details of processing that may be performed in an embodiment in accordance with techniques herein, what will now be described is how to evaluate/determine whether the RAID extent distribution among the N PDs of the pool is even or not. In at least one embodiment, a neighborhood matrix may be used.

Figure 5:
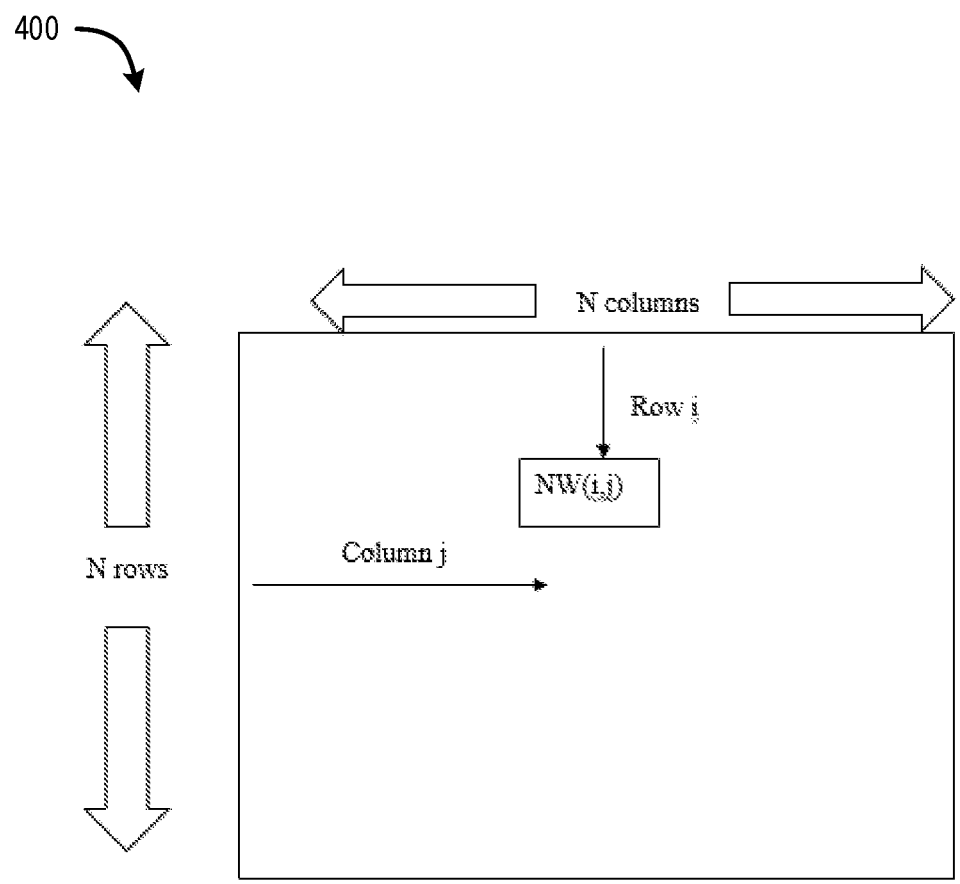
FIG. 5 is an example illustrating a neighborhood matrix that may be used in an embodiment in accordance with techniques herein.

As illustrated in FIG. 5, a neighborhood matrix is an N*N square matrix, where N is the number of PDs in the pool as described above. Each entry or cell of the matrix may be identified using a pair of coordinates, i, j, where "i" denotes the row of the matrix and "j" denotes the column of the matrix. An entry or cell of the matrix located in row i, column j, may be referred to as NW(i, j), whereby the contents of the entry or cell may be a numeric quantity identifying how many times PD i of the pool has ever neighbored with PD j of the pool. Two disk or PD extents, such as from two different PDs, may be defined as neighbor extents if both such disk or PD extents are included in the same mapped RAID extent. Thus, NW(i,j) denotes the number of times a disk extent from PDi has been selected or included in the same mapped RAID extent as a disk extent from PDi (e.g., how many times PDi and PDj have been neighbors or included in the same mapped RAID extent). While allocating a mapped RAID extent, processing includes selecting disk extents from different PDs. We define PDs in this same mapped RAID extent as neighbors with each other one time. The neighborhood matrix is symmetric, since based on the foregoing definition of "neighbor", NW(i, j) should be equal to NW(j, i).

To further illustrate and with reference back to FIG. 4A, consider an example of processing performed when selecting 5 disk extents for a single mapped RAID extent Q being allocated from the pool Assume the 5 disk extents selected for forming mapped RAID extent Q have been selected from PD 0, PD 1, PD 2, PD 3 and PD 4 (e.g., 1 disk extent selected from each of PDs 0-4). In this case, the neighborhood matrix may be updated as a result of the foregoing selection of 5 disk extents whereby the following entries of the matrix may each be incremented by one (1):

| 0, 1 | 0, 2 | 0, 3 | 0, 4 |
| 1, 0 | 1, 2 | 1, 3 | 1, 4 |
| 2, 0 | 2, 1 | 2, 3 | 2, 4 |
| 3, 0 | 3, 1 | 3, 2 | 3, 4 |
| 4, 0 | 4, 1 | 4, 2 | 4, 2 |

If mapped RAID extents are distributed evenly among the N PDs of the pool, the values stored in cells or entries of the matrix should be the same, or approximately so (e.g., within some specified tolerance or amount of one another) and also excluding the diagonal. Therefore, techniques herein may select different disk extents when allocating to form a mapped RAID extent where such selection results in the values stored across entries in the matrix almost the same after completing RAID extent allocation. Generally, any suitable technique may be used which attempts to have a goal of such even distribution to minimize differences or variances between values of entries in the neighborhood matrix. Described in more detail below is one particular technique that may be used in at least one embodiment. Before describing the particular technique, what will now be described are examples illustrating good or desired distri-bution of values in the neighborhood matrix and also bad or undesired distribution of values in the neighborhood matrix.

Figure 6:
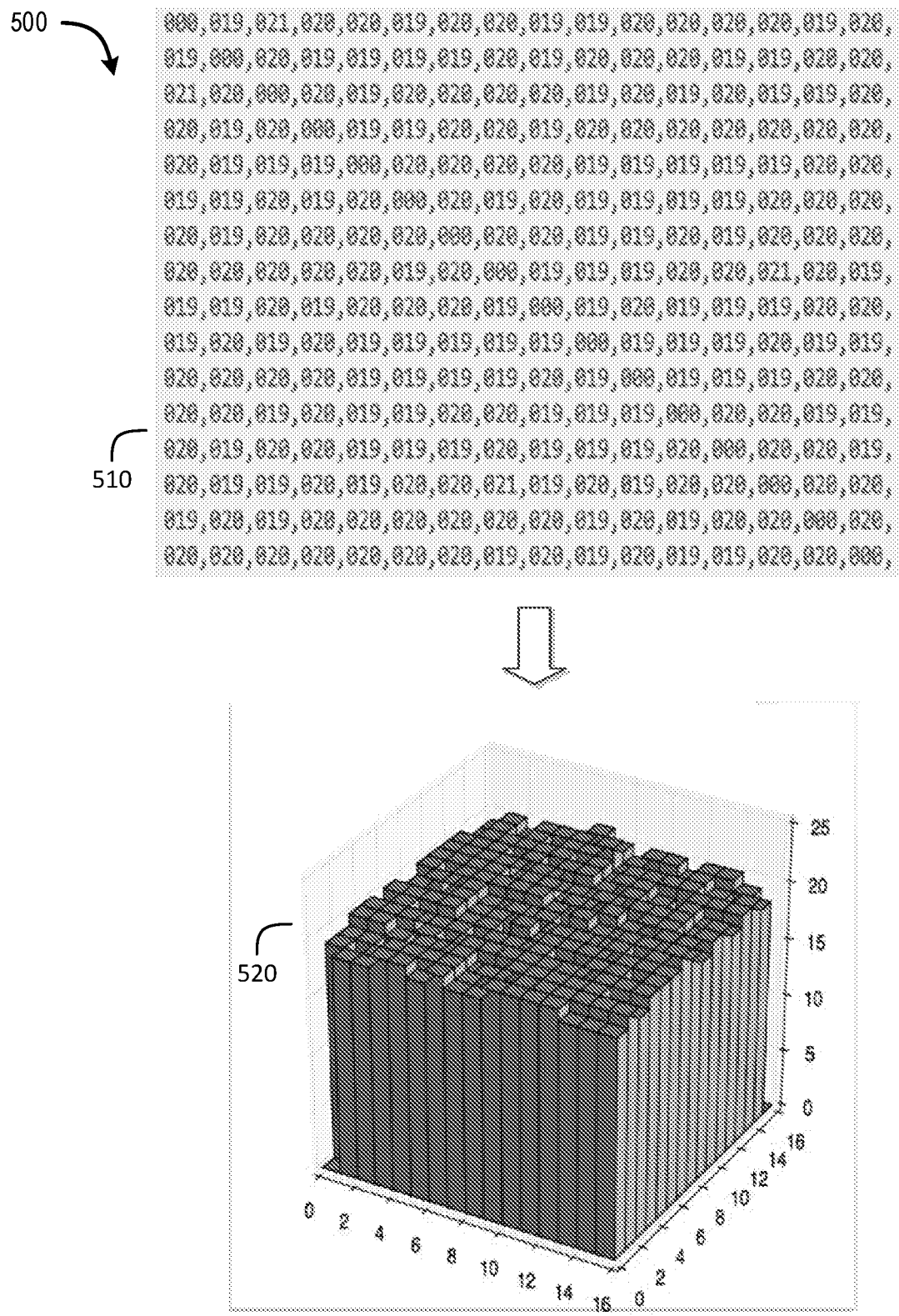
FIG. 6 is an example illustrating a good relatively even distribution of mapped RAID extents.

Referring to FIG. 6, shown is an example 500 illustrating a good or desired distribution of values in the in the neighborhood matrix in an embodiment in accordance with techniques herein. Element 510 illustrates the matrix have values in entries which are relatively close to one another, such as approximately the same within some specified tolerance or difference. For example, in the matrix 510, values of entries in the matrix range from 19-21, inclusively. Element 520 provides a visualization of the values in the matrix 510 whereby the 520 illustrates a relatively flat or even distribution.

Figure 7:
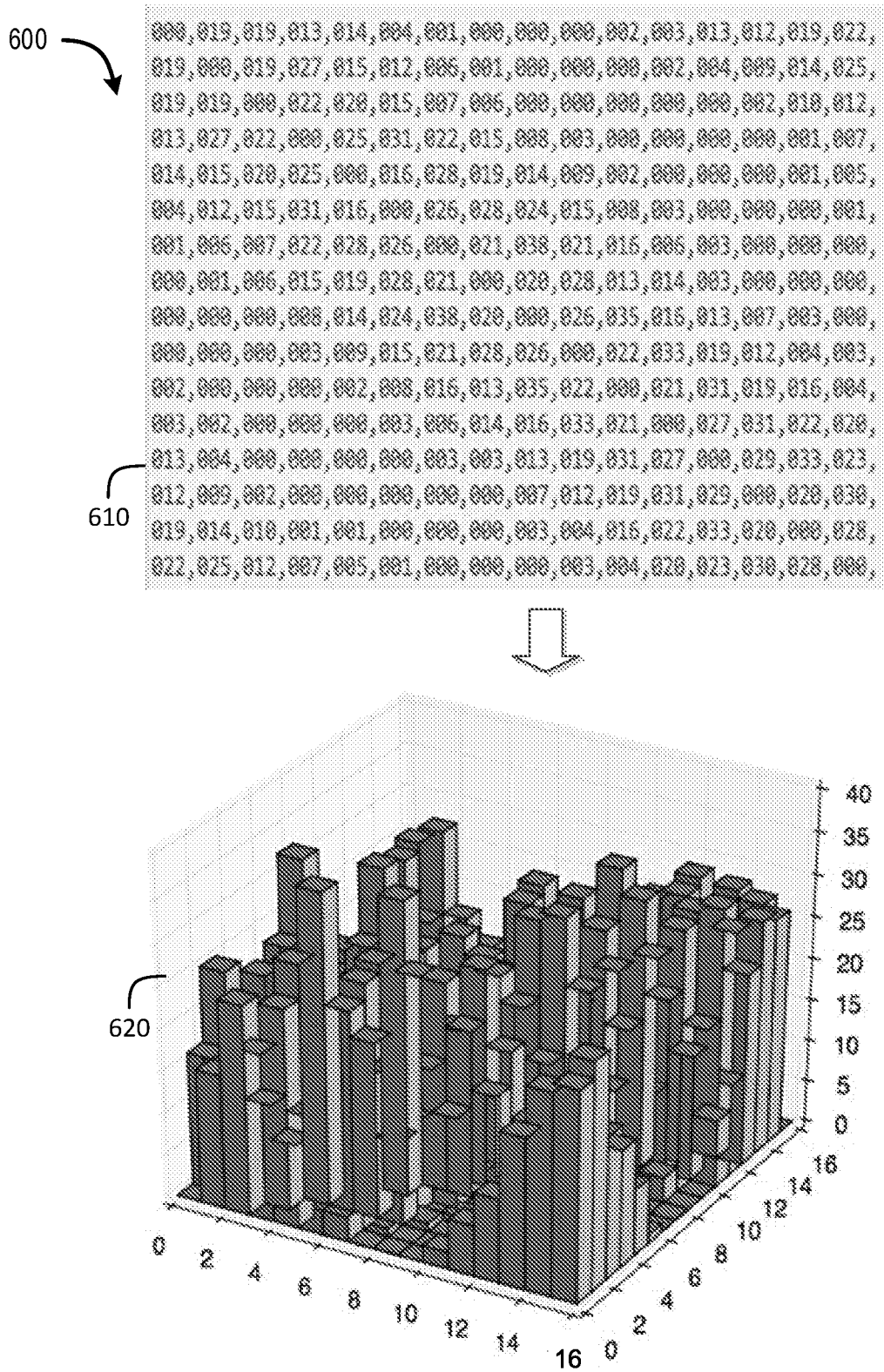
FIG. 7 is an example illustrating a relatively uneven distribution of mapped RAID extents across storage devices of a pool.

Referring to FIG. 7, shown is an example 600 illustrating a bad or undesired distribution of values in the in the neighborhood matrix in an embodiment in accordance with techniques herein. Element 610 illustrates the matrix have values in entries which are not relatively close to one another, such as not approximately the same within some specified tolerance or difference. For example, in the matrix 610, values of entries in the matrix have q wide and varying range with some values being zero which means that some PDs never neighbor each other. Therefore, in this case, if one PD fails, some PDs would not participate in the rebuilding procedure. Element 620 provides a visualization of the values in the matrix 610 whereby the 620 does not illustrate a relatively flat or even distribution (e.g., as may be contrasted with 520 of FIG. 6).

What will now be described in more detail is one way in which an embodiment in accordance with techniques herein may perform selection of disk extents for use in formation of a mapped RAID extent. This may also be referred to as a RAID extent selection algorithm that may be performed in at least one embodiment in accordance with techniques described herein. For convenience and consistent with other discussion herein, assume the number of PDs in the pool is N and the RAID extent width is M. Thus, there are $C_n^m$ possible ways to combine or select disk extents in connection with forming a single mapped RAID extent. As an example and continuing with a RAID-5 configuration with a RAID extent width of 5, 4D+1P (i.e., 4 data members and 1 parity member) mapped onto a pool having 16 PDs (i.e., N=16). In this case, there are $C_{16}^5$=4368 different ways to allocate a mapped RAID extent from the 16 PDs of the pool (e.g., select 5 disk extents from 5 PDs from a pool of 16 PDs).

After allocating a mapped RAID extent, the neighborhood matrix may be updated accordingly as described herein. While allocating disk extents for the mapped RAID extent formation, we could try all the possible disk extent combinations, and select the one which would make the matrix more "flat". In other words, processing may be performed to select the particular set or combination of disk extents which would make numbers in the matrix much closer to each other. For example, an example embodiment may use a suitable metric, measurement or statistic, such as variance whereby the variance of all values in matrix entries may be used as an indicator or measurement of array "flatness" (e.g., indicator or measurement of evenness of the distribution of neighborhood matrix entries). Variance and other suitable calculations and statistics are known in the art. Variance may be calculated, for example, by determining the mean or average value with respect to all entries, excluding the diagonal entries of the matrix. For each entry of the matrix, a difference between the value in the entry and the mean may be determined, and the difference may then be squared (e.g. power of two). The variance is the sum of the foregoing squared differences as determined for each matrix entry (excluding matrix diagonal entries).

For each mapped RAID extent allocation, an embodiment may loop over all the possible choices or combination of disk extents, and select the "best" one, which will make the matrix more "flat" (e.g. select the 5 disk extents for the mapped RAID extent from the 5 PDs which results in the minimum or smallest variance with respect to the neighborhood matrix entries). In such an embodiment, eventually when all the mapped RAID extents are allocated, we expect the final matrix to remain "flat", or approximately so, which is close to global optimization solution.

However, when N, the number of PDs in the pool is large, the number of all possible choices or combinations may be unacceptably large in that considering each such combination as described above becomes computationally unacceptable and/or impractical in implementation (e.g., does not scale as N increases). For example, consider the case where N=100 and M=5. In this case there are $C_{100}^5 = 75287520$ different ways to evaluate and allocate a mapped RAID extent. Current data storage array can have over 1000 PDs, resulting in an astronomically large number of combinations. As a result, for all but the simplest data storage systems, evaluating all the possible mapped RAID extent allocation combinations is all but impossible to reasonably compute.

To overcome this and other problems, example embodiments employing the techniques presented herein that can significantly reduce the number of mapped RAID extent combinations that need to be evaluated while maintaining the desired flatness of the neighborhood matrix. As will be described in more detail below, at least one embodiment, when creating mapped RAID group, the disk extents are chosen one by one for each RAID extent. In addition, different criteria can be used when choosing the first disk extent than what is used when choosing the remaining disk extents in the RAID extent. For each iteration, the particular criteria can be used to evaluate whether the mapped RAID extents are evenly distributed across the disk pool.

Various example embodiments employ a RAID extent selection algorithm implemented using dynamic programming techniques together with a disk extent consumed ratio value. For disks in extent pool, the more disk extents consumed by the mapped RAID, the more I/O that need to be serviced. Consequently, it is important to ensure that the disk extent consumed ratio be balanced among the disks. The consumed disk extent count of i-th disk is denoted herein as $C(i)$.

The RAID extent selection algorithm allocates disk extents one by one for the RAID extents. For each iteration, all possible disk extent allocate positions are evaluated to identify the "best" one. In this instance, best means the choice that will result in the lowest variance of the neighborhood matrix values. The search depth for one disk extent is the pool width N, therefore, the algorithm complexly to layout one RAID extent is: O(N*M). This is significantly smaller then $C_n^m$ resulting in an extremely small computation load. When allocating the first disk extent for the RAID extent, the Neighborhood Matrix is identical for all possible choices as there is only one disk extent. Therefore, we can use then neighborhood matrix to identify the best choice. In this example, disk extent consumed count is used as the criteria for evaluating the first disk extent. As a result, the disk extent on the least consumed disk is selected as the first disk extent for the RAID extent.

Figure 8:
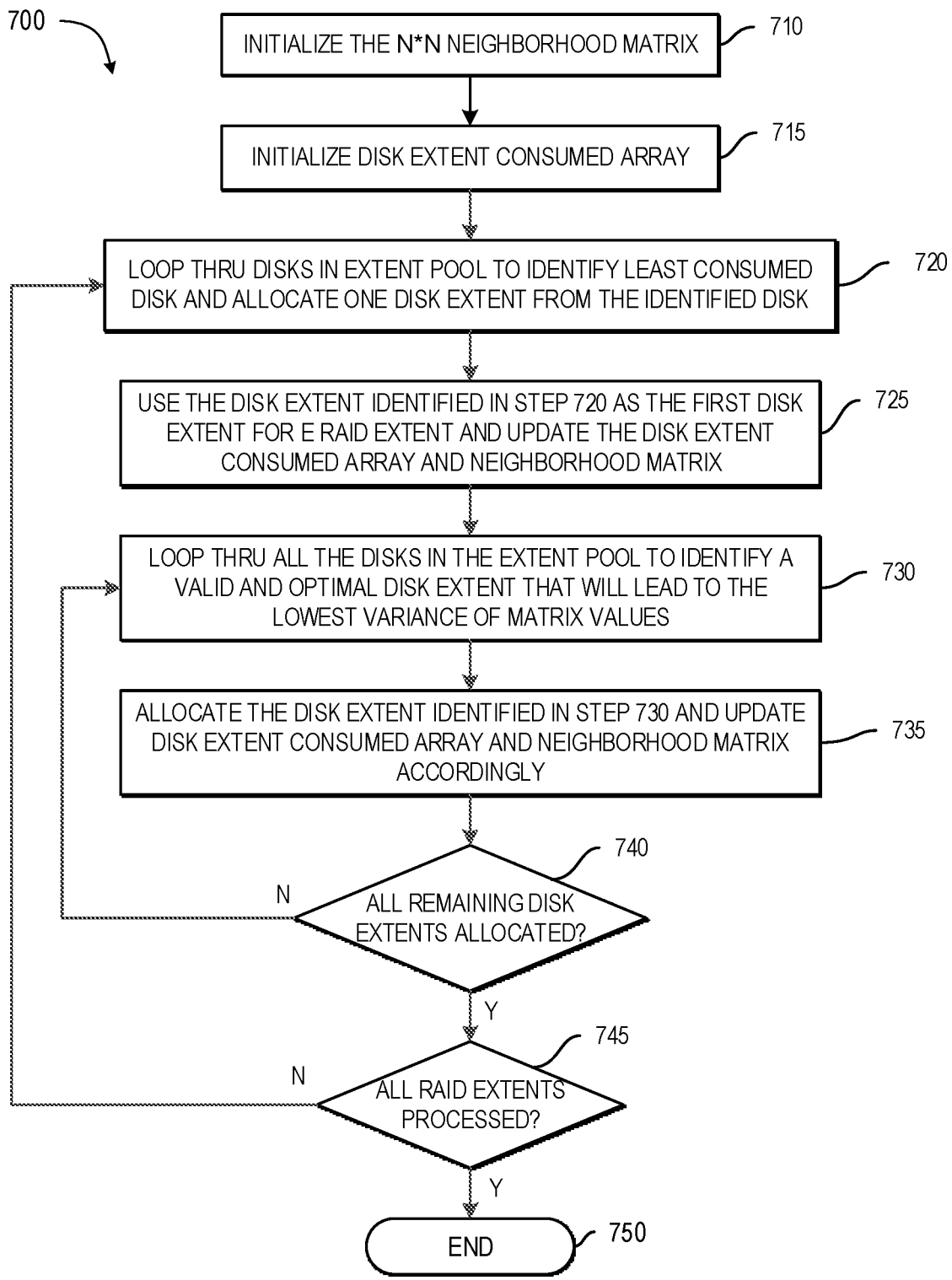
FIG. 8 is a flowchart of the technique illustrating processing steps that may be performed in an embodiment in accordance with techniques herein.

In at least one embodiment, the disk extent consumed ratio used in conjunction with the mapped RAID select algorithm may be performed as described below. As described above, N denotes the number of PDs in the pool; M denotes the width of the mapped RAID extent (e.g. number of disk extents in each mapped RAID extent); and E may denote the number of mapped RAID extents to be formed or allocated from the pool. The following steps may be performed in an embodiment in accordance with techniques herein with reference to FIG. 8.

In a first step 710, each cell or entry of the N*N neighborhood matrix is initialized to 0. As described above, the neighborhood matrix can, but need not, be a two dimensional array. In step 715, each cell or entry in the disk extent consumed array (also referred to as simply consumed array) is initialized to 0. The disk extent consumed array, denoted as $C(i)$ can be a one dimension array where each entry represents a corresponding disk, therefore, the array includes N entries.

Next, disk extents are allocated for E RAID extents in the newly created RAID group. Steps 720-740 are repeated for each RAID extent. At step 720, the technique loops thru all the disks in the extent pool to identify the least consumed disk, and once identified, one disk extent is allocated from the identified least consumed disk. At step 725, the disk extent identified in step 720 is used as the first disk extent for E RAID extent. The disk extent consumed array and Neighborhood Matrix are then updated accordingly. At step 730, for the remaining disk extents, loop thru all the disks in the extent pool to identify a valid and optimal disk extent that will result in the lowest variance of matrix value. At step 735, the disk extent identified in step 730 is allocated after which the disk extent consumed array and the neighborhood matrix are updated accordingly. At step 740, of any remaining disk extents still need to be processed and allocated, the technique loops back to step 730, otherwise the flow proceed step 745. At step 745, if any RAID extents still need to be processed, the technique loops back to step 720, otherwise flow proceeds to step 750 where the process ends.

Described above are techniques that may be used to layout mapped RAID extents with a goal of distributing disk extents forming such mapped RAID extents evenly across all PDs of the pool. With such techniques described herein, when PD of the pool fails, all the other PDs are involved in the entire rebuilding procedure (e.g., used to rebuild or reconstruct the data of the failed PD). Therefore, the rebuilding performance is improved over performance typical or expected with existing traditional RAID groups. As described above, techniques herein may use a neighborhood matrix to evaluate whether the mapped RAID extents are evenly distributed across PDs of the pool. In at least one embodiment, a small subset of combinations may be selected for evaluation and consideration rather than the entire set of combinations in efforts to reduce the computing complexity and associated computation time and resources utilized.

While the above description refers to a data storage system or array having flash based SSD, the techniques may be similarly applied according to alternative embodiments directed to other systems implementing flash based SSDs such as servers, network processors, compute blocks, converged systems, virtualized systems, and the like. Further, the techniques may be similarly applied such that the steps may be performed across multiple different systems (e.g., some steps performed on a server and other steps performed on a storage array).

It will be appreciated that an embodiment may implement the technique herein using code executed by a computer processor. For example, an embodiment may implement the technique herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method for use in managing mapped RAID extents in data storage systems, the method comprising:
   creating and initializing a neighborhood matrix denoting a distribution of neighboring physical storage portions across N physical storage devices of a pool;
   based on a disk utilization ratio, identifying a disk from which to allocate a first disk extent choice for a raid extent;
   allocating, from the identified disk, a first disk extent for the raid extent; and
   for each of the subsequent disk extents for the raid extent,
      identifying, within all the disks in the pool, a valid disk extent whose allocation as a next disk extent for the raid extent will result in neighborhood matrix values with a lowest variance,
      allocating the identified valid disk extent, and
      updating the neighborhood matrix and a disk extent consumed array.

2. The method of claim 1, wherein identifying a disk from which to allocate the first disk extent choice comprises:
   analyzing disks in an extent pool to identify a disk servicing fewest input output operations (I/Os) in the extent pool and allocating a disk extent from the identified disk.

3. The method of claim 1, wherein each entry of the neighborhood matrix denotes a count of how many times a physical storage device of the pool has neighbored physical storage device of the pool.

4. The method of claim 1, further comprising:
   creating and initializing the disk extent consumed array denoting a disk consumption metric, the array storing a value for each of the N physical storage devices of the pool.

5. The method of claim 1, wherein a first physical storage device of the N physical storage devices fails and a group X of remaining ones of the N physical storage devices of the pool that have not failed, and the method comprises:
   determining a first set of one or more physical storage portions of the first mapped RAID extent stored on the first physical storage device that failed; and
   relocating each physical storage portion of the first set to a physical storage device of the group X, evenly distributing the first set of one or more physical storage portions among the physical storage devices of group X to involve the physical storage devices of group X in a rebuilding process.

6. A system comprising:
   a processor; and
   a memory comprising code stored therein that, when executed, performs a method of managing mapped RAID extents in data storage system comprising:
      creating and initializing a neighborhood matrix denoting a distribution of neighboring physical storage portions across N physical storage devices of a pool;
      based on a disk utilization ratio, identifying a disk from which to allocate a first disk extent choice for a raid extent;
      for each of the subsequent disk extents for the raid extent,
         identifying, within all the disks in the pool, a valid disk extent whose allocation as a next disk extent for the raid extent will result in neighborhood matrix values with a lowest variance,
         allocating the identified valid disk extent, and
         updating the neighborhood matrix and a disk extent consumed array.

7. The system of claim 6, wherein when the code performs identifying a disk from which to allocate the first disk extent choice, the code further performs:
   analyzing disks in an extent pool to identify a disk servicing fewest input output operations (I/Os) in the extent pool and allocating a disk extent from the identified disk.

8. The system of claim 6, wherein each entry of the neighborhood matrix denotes a count of how many times a physical storage device of the pool has neighbored physical storage device of the pool.

9. The system of claim 6, wherein the code further performs:
   creating and initializing a disk extent consumed array denoting a disk consumption metric, the array storing a value for each of the N physical storage devices of the pool; and
   configuring the allocated first disk extent for a first RAID extent and updating the neighborhood matrix and the disk extent consumed array, wherein the first RAID extent is included in mapped RAID extents.

10. The system of claim 6, wherein a first physical storage device of the N physical storage devices fails and a group X of remaining ones of the N physical storage devices of the pool that have not failed, and wherein the code further performs:
    determining a first set of one or more physical storage portions of the first mapped RAID extent stored on the first physical storage device that failed; and
    relocating each physical storage portion of the first set to a physical storage device of the group X, evenly distributing the first set of one or more physical storage portions among the physical storage devices of group X to involve the physical storage devices of group X in a rebuilding process.

11. A non-transitory computer readable medium comprising code stored thereon that, when executed, performs a method of managing mapped RAID extents in data storage system comprising:
    creating and initializing a neighborhood matrix denoting a distribution of neighboring physical storage portions across N physical storage devices of a pool;

based on a disk utilization ratio, identifying a disk from which to allocate a first disk extent choice for a raid extent;

allocating, from the identified disk, a first disk extent for the raid extent; and for each of the subsequent disk extents for the raid extent,
identifying, within all the disks in the pool, a valid disk extent whose allocation as a next disk extent for the raid extent will result in neighborhood matrix values with a lowest variance,
allocating the identified valid disk extent, and
updating the neighborhood matrix and a disk extent consumed array.

12. The non-transitory computer readable medium of claim 11, wherein when the code performs identifying a disk from which to allocate the first disk extent choice, the code further performs:
analyzing disks in an extent pool to identify a disk servicing fewest input output operations (I/Os) in the extent pool and allocating a disk extent from the identified disk.

13. The non-transitory computer readable medium of claim 11, wherein each entry of the neighborhood matrix denotes a count of how many times a physical storage device of the pool has neighbored physical storage device of the pool.

14. The non-transitory computer readable medium of claim 11, wherein the code further performs:
creating and initializing the disk extent consumed array denoting a disk consumption metric, the array storing a value for each of the N physical storage devices of the pool.

15. The non-transitory computer readable medium of claim 11, wherein a first physical storage device of the N physical storage devices fails and a group X of remaining ones of the N physical storage devices of the pool that have not failed, and wherein the code further performs:
determining a first set of one or more physical storage portions of the first mapped RAID extent stored on the first physical storage device that failed; and
relocating each physical storage portion of the first set to a physical storage device of the group X, evenly distributing the first set of one or more physical storage portions among the physical storage devices of group X to involve the physical storage devices of group X in a rebuilding process.

16. The method of claim 4, wherein the first disk extent is included in mapped RAID events.

17. The non-transitory computer readable medium of claim 14, wherein the first disk extent is included in mapped RAID events.

\* \* \* \* \*